Figure 1:
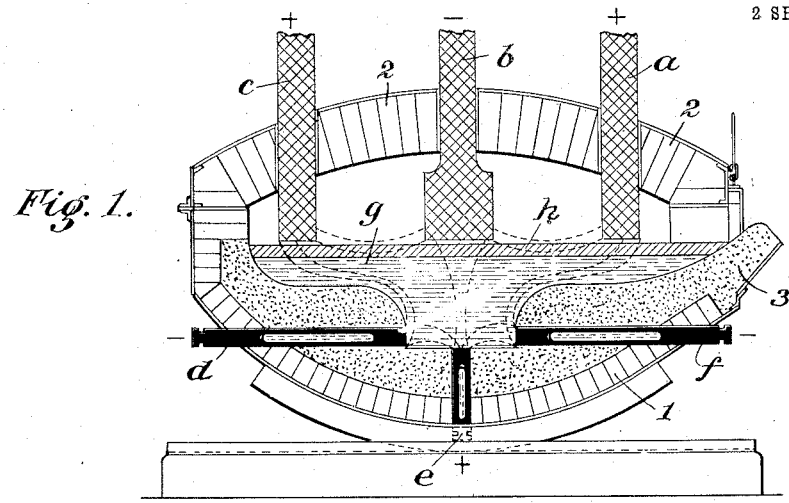

H. NATHUSIUS.
ELECTRIC FURNACE.
APPLICATION FILED MAY 6, 1908.

983,303.

Patented Feb. 7, 1911.

2 SHEETS—SHEET 1.

Witnesses:
Waldo M. Chapin
James D'Antono

Inventor,
Hans Nathusius,
Rosenbaum & Stockendel

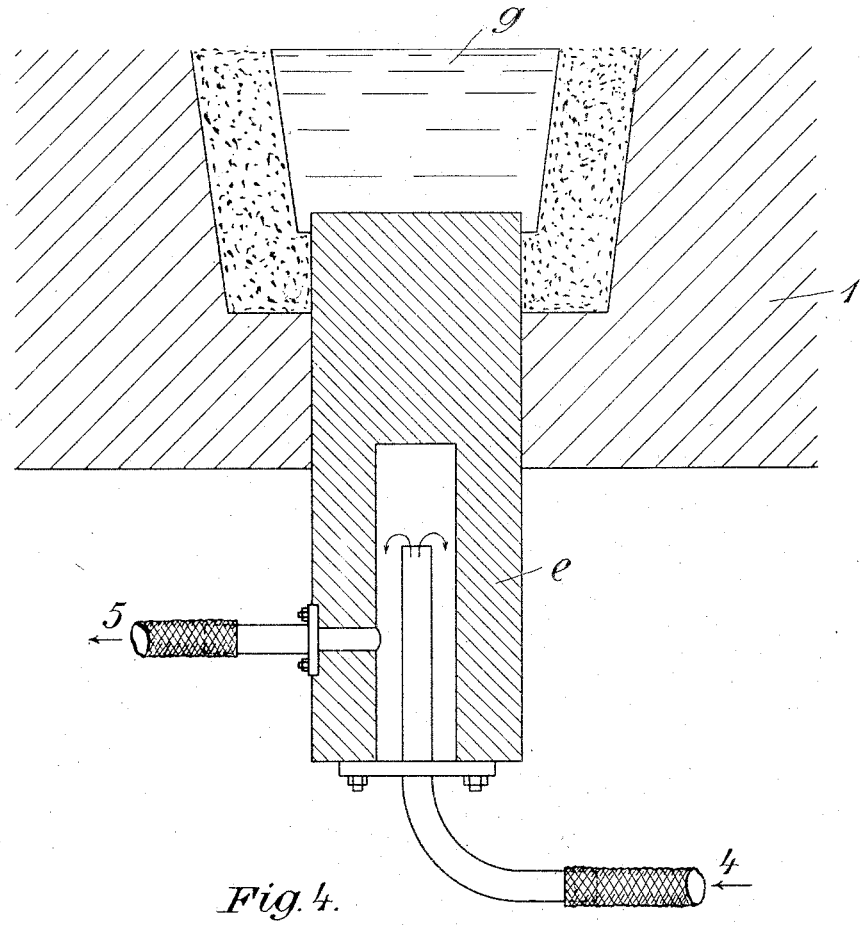

UNITED STATES PATENT OFFICE.

HANS NATHUSIUS, OF FRIEDENSHÜTTE, NEAR MORGENROTH, GERMANY.

ELECTRIC FURNACE.

983,303.  Specification of Letters Patent.  Patented Feb. 7, 1911.

Application filed May 6, 1908. Serial No. 431,158.

*To all whom it may concern:*

Be it known that I, HANS NATHUSIUS, engineer, subject of the King of Saxony, residing at Friedenshütte, near Morgenroth, in Germany, have invented new and useful Improvements in Electric Furnaces, of which the following is a specification.

This invention relates to an electric furnace which is suitable for all operations generally carried out in electric furnaces, more particularly for refining and manufacturing steel.

As is well known, the manufacture of good steel depends on a good and uniform heating of the steel bath and on the obtainment of a slag which should be as hot and as fluid as possible and therefore most suitable for reaction. Existing furnaces do not comply with these requirements, partly owing to the use of a small melting hearth, so that the steel bath has only a small surface of contact with the slag cover. Furthermore the expulsion of gases from the steel bath takes place only with difficulty, and in performing the necessary work in the surface of the bath, such as the frequent removal of the slag by means of long iron rods or the stirring of the metal bath by means of wooden or steel bars or the distribution of the required additions on the surface of the bath, etc., difficulties are met with, because in such cases the electrodes generally rest only on the slag cover. Accordingly they are usually raised, which results in the bath being cooled, as no current is passing through it at such time. On the other hand the carrying out of the above work while current is passing would be difficult and complicated, as the tools may come into contact with the electrodes and sometimes displace them, and the bath is liable to get dirty owing to the broken off pieces of the electrodes falling into it, apart from the fact that contact with such electrodes is dangerous to the life of the attendants.

The above disadvantages are obviated in the furnace according to this invention by the electrodes being distributed over the whole circumference of the melting hearth which preferably has the shape of a cup, so that the electric current is forced to circulate completely around the melting bath, for example, a bath of steel to be refined, and to heat it in a uniform or adjustable manner at each single point. Since, as already stated, the electrodes are arranged on the whole circumference of the bath, that is to say, both on its surface and also on the portions resting on the sole plate of the hearth, the raising of the electrodes arranged on the surfaces, for the purpose of carrying out the above mentioned work, does not interrupt the current which continues to pass through the bottom portions of the bath, so that no cooling of the bath can take place during the work in question.

Figure 3:
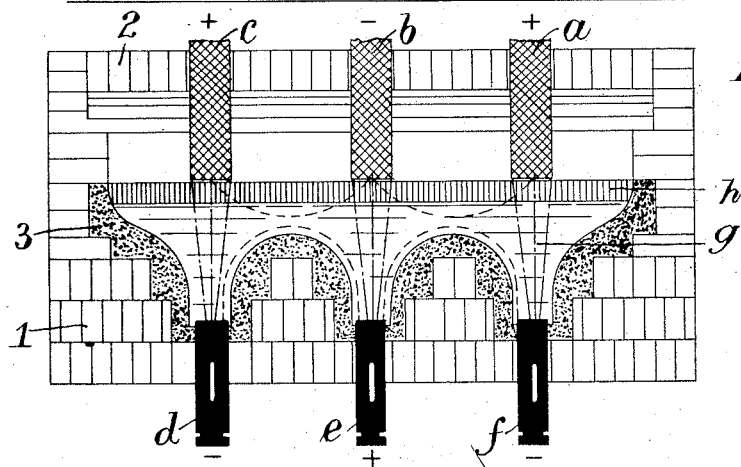
Figure 2:
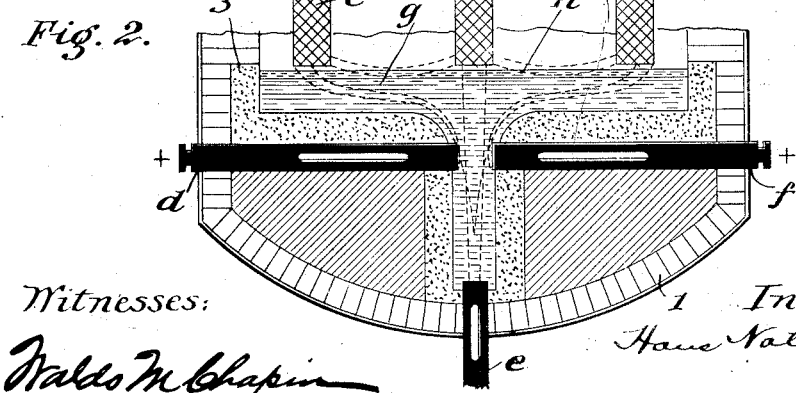

In the accompanying drawings: Figure 1 shows diagrammatically a construction of furnace, according to the present invention, in vertical section, Figs. 2 and 3 are vertical sections showing slightly modified constructions. Fig. 4 is a detail view showing the method of cooling the electrodes.

1 is a furnace covered by an arch 2, the hearth $g$ of which having the shape of a cup, is made of some suitable refractory material 3. In the construction illustrated, three vertical carbon electrodes $a\ b\ c$ pass through the arch 2, while into the bottom space of the melting hearth penetrate the cooled steel electrodes $d\ e\ f$. As shown in Figs. 2 and 3, the lowermost electrodes project into the bottoms of recesses arranged in the bottom of the hearth. The central of the two upper electrodes, namely, the electrodes $b$ (Figs. 1, 2 and 3) is connected for instance to the negative pole of a suitable source of electricity, and the two outer electrodes $a$ and $c$ to the positive pole. The position as regards the two bottom ones is a reversed one, the central electrode $e$ being connected to the positive pole, while the outer ones $d$ and $f$ are connected to the negative pole the same dynamo or current source being employed for the upper and lower electrodes. Owing to this arrangement of electrodes, the current is forced first to pass from the central upper electrode $b$ through the slag cover $h$ and the upper portion of the steel bath to the electrodes $a$ and $c$. Secondly, from the central bottom electrode $e$ to the outer bottom electrodes $d$ and $f$, whereby the liquid steel situated at the bottom is also maintained hot. Moreover, owing to the current being forced to pass from the outer carbon electrodes $a$ and $c$ to the outer steel electrodes $d$ and $f$ at the bottom, the bath itself is, so to say, completely surrounded by electric currents of suitable heating power, and at the same time a partial current circulating between the electrodes $b$ and $e$ passes through the said bath so that the steel is everywhere maintained uniformly hot and does not get cooled at the walls. In that way, the formation of crust is prevented. The importance of the surrounding admission of current to the outer surfaces of the bath in a closed circuit and along the walls, must not be underestimated in view of the smallness of the charges of electric furnaces where crust is easily formed owing to the mass of steel being small compared to the cooling mass of furnace. Another advantage of the current circulating in the steel bath is the excellent mixing of the steel bath, and the obtainment of a thoroughly uniform final product, as the current acts like a stirring device. The chief point is however, that, owing to this arrangement of electrodes, a very good heating of the slag cover is insured, whereby the same becomes very fluid and capable of easily entering into reactions. It is obvious that the duration of the refining period is thus considerably reduced and a thorough refining retained.

Owing to the cup-shaped form of the hearth, a comparatively large surface is formed and consequently the required large surface of contact between the steel bath and the slag cover is obtained in spite of the small quantity of liquid steel. Further in accordance with this invention, the difficulty of expelling the gases which is met with owing to the use of hearths of the usual shape (trough or crucible shape) and to the consequent depth of the steel bath, is avoided. Owing to the cup-shaped formation of the hearth plate, the gases contained in the steel bath can easily rise upward, and settle on the top with great difficulty or even not at all. This favorable result is still further increased by giving a slow rocking motion to the furnace during the refining process, whereby a thorough contact of the slag which is hot and fluid and therefore easily capable of entering into re-action with the also hot steel, is obtained, and thus the refining action of the slag is still further increased.

The construction of the furnace shown in Fig. 2, differs from the construction shown in Fig. 1 only by the shape of the melting hearth being a different one, namely a T-shaped one, whereby the surface of contact of the material to be melted with the refining slag cover covering the same, is increased in a manner favorable to refining. With this is also combined the greater facility of expelling gases, and as the electric current has to follow a longer path, a higher degree of heat can be attained. The same result may also be obtained by arranging one or more recesses in the sole or the melting hearth of the furnace as shown in Fig. 3, whereby the surface of contact of the material to be melted with the refining slag cover covering the same, is increased in a manner favorable to refining. With this is also combined the greater facility of expelling gases, and as the electric current has to follow a longer path, a higher degree of heat can be attained.

The electrodes $d$, $e$, $f$, of the electric furnace are preferably made of steel and as illustrated in Fig. 4 are made hollow in order to enable them to be cooled by a circulation of water, which is introduced through the pipe 4 and discharged through a pipe 5.

What I claim is:

1. An electric hearth furnace having a melting hearth adapted for refining purposes, and electrodes of alternating polarity, the bath contacting ends of said electrodes being arranged about the bath in said hearth with some of said ends at a different elevation to others thereof of unlike polarity, whereby the electric current is forced to pass substantially vertically through and about the bulk of the material contained in said hearth.

2. In an electric furnace, a hearth, carbon electrodes arranged above the hearth, and electrodes of steel in the base of the hearth, adjacent electrodes differing in polarity throughout the hearth.

3. In an electric furnace, a hearth, non-metallic electrodes arranged above the hearth, and metallic electrodes in the base of the hearth, adjacent electrodes differing in polarity throughout the hearth.

4. In an electric furnace, a hearth, a plurality of electrodes of differing polarity arranged above the hearth, and at least one additional electrode in the base thereof, whereby the electric current is forced to pass through and about the bulk of the material in said hearth.

In testimony whereof I have signed my name to this specification in the presence of two subscribing witnesses.

HANS NATHUSIUS.

Witnesses:
ERNST KATZ,
ERNST BLEISCH.